Figure 1:
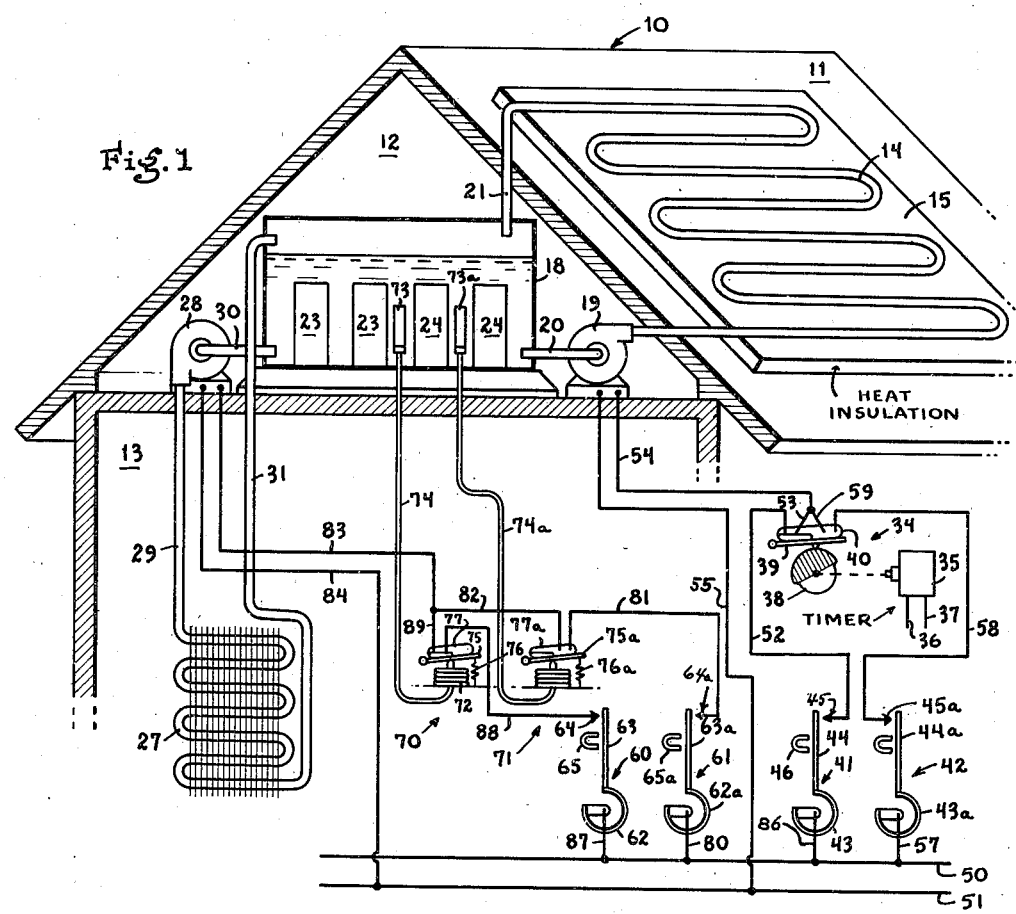

Feb. 22, 1944.    A. B. NEWTON    2,342,211

UTILIZATION OF NATURAL HEATING AND COOLING EFFECTS

Filed Oct. 17, 1941

INVENTOR.
Alwin B. Newton
BY George H. Fisher
Attorney

Patented Feb. 22, 1944

2,342,211

UNITED STATES PATENT OFFICE 2,342,211

UTILIZATION OF NATURAL HEATING AND COOLING EFFECTS

Alwin B. Newton, Minneapolis, Minn., assignor to Minneapolis-Honeywell Regulator Company, Minneapolis, Minn., a corporation of Delaware Application October 17, 1941, Serial No. 415,433

8 Claims. (Cl. 257—3)

This invention relates to methods and means for utilizing natural heating and cooling effects by storing these effects when they are available by means of heat storers and cold storers, and utilizing the stored heat or stored cooling effects when necessary to control the temperature of a given objective. The natural heating and cooling effects which the invention primarily takes advantage of, are those occasioned by radiation of heat from the sun to a heat absorbtive body and by radiation of heat from a radiating body to space. By utilizing the radiant heat effects, much greater temperature differentials are produced between different bodies or mediums than can be produced by conduction or convection methods of heat transfer under similar circumstances. By reason of these greater differentials, the heating effect of the sun and the cooling effect of radiation from a hot body to space are made more available and greater advantage can be taken of them.

My invention comprehends cooling a medium by allowing its heat to be radiated from a radiating body to space at night. The principle upon which this effect is based is the same as that which is operative when frost forms on the surface of the earth even though the temperature of the air does not fall to the freezing point. That is, the earth is a body having good heat absorptive and radiating properties, and after the earth has been heated during the day by radiation from the sun it is cooled at night when it radiates this heat back to space. This cooling effect of the earth by reason of the radiation of its heat to space lowers its temperature to a value lower than the temperature of the air at the surface of the earth. Thus the moisture is condensed out of the air and is formed as frost on the surface of the earth. Temperatures may be produced by radiation in this manner which are considerably lower than the lowest air temperature which may have existed during the night.

My invention also comprehends heating a medium by means of direct radiation from the sun, and likewise temperatures may be reached in this manner which are considerably higher than the temperature of the air ambient to the body which is being heated by radiation. These cooling and heating effects produced by radiation are stored, according to my invention, during the time the effect is being produced, and at other times when temperature change of a given objective is needed, advantage may be taken of the stored heating and cooling effects as needed.

My invention finds an ideal application in air conditioning systems for buildings, particularly in regions having a relatively mild climate. In such climates, the weather conditions are such during a good part of the year that cooling may be required during the day while the nights are cool enough so that heating is perhaps not required but nevertheless natural cooling effects can be stored up for use in cooling on the following day. Also in regions having mild climates, the weather conditions are often such during a part of the year that while some heating may be required at night, usually the days are warm enough so that heating is not required but natural heat can be stored up during the day for use at night. My invention and its principles could of course also be employed for air conditioning under weather conditions such that cooling is actually required during the day and heating at night.

One of the principal objects of my invention is to provide novel means for storing natural heating and cooling effects so that they may be used when necessary to control the temperature of a given objective.

Another primary object of my invention is to provide methods and means of making use of the natural heating and cooling effects of radiation from the sun and radiation from a body to a space.

Another object of my invention is to provide novel means and arrangements for storing heat and cold, that is, heating and cooling effects, produced as a result of transfer of heat by radiation.

Another object of my invention is to provide a novel method and means for storing heat wherein a substance which is normally a solid is melted when the heat is available and is allowed to solidify again when it is desired to make use of the heat.

Another object of my invention is to provide a means for cooling a medium by direct radiation of its heat to space at night and for heating the medium by direct radiation of heat from the sun during the daytime.

Another object of the invention is to provide control means for controlling the heat and cold storing apparatus so that the heating or cooling effect is utilized at a time when it is necessary to do so for maintaining desired temperature conditions of a given objective.

In accordance with my invention, means are provided for circulating a fluid medium through a device adapted to be heated by direct radiation from the sun or to be cooled by radiation from the device to space at night.

Another object of my invention is to provide time and temperature responsive control means for controlling the circulation of medium through the device both at night and in the daytime so that the fluid medium is circulated so as to cause either a heating effect or cooling effect to be stored up depending upon whether or not the temperature is indicative of an expectancy of heating or cooling requirements of an objective at a later time.

Figure 2:
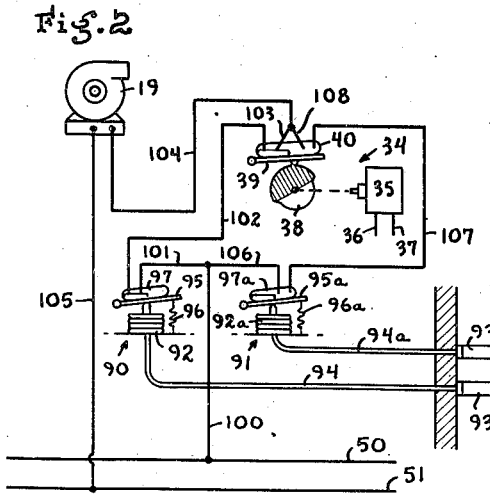
Figure 3:
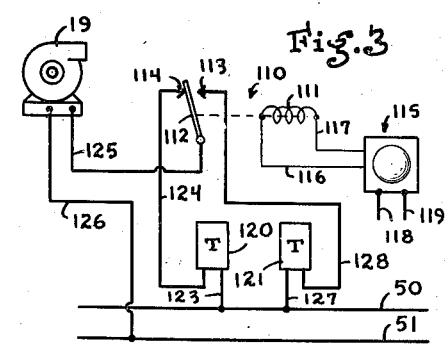

Fig. 1 represents diagrammatically a portion of a building structure having a form of my invention associated therewith, Fig. 2 represents a modified form of control arrangement, and Fig. 3 represents another modified form of control arrangement.

Referring to Fig. 1 of the drawing, numeral 10 represents diagrammatically a building structure having a roof 11, an attic 12, and another enclosed portion or space 13. Mounted on the roof of the building is a heat exchange coil 14 of the serpentine type, there being heat insulating material 15 disposed between the roof of the building and the coil 14 to insulate against transfer of heat between the roof and the coil by conduction and radiation. The insulating material and the exchanger may be fastened to the roof in any suitable manner.

In the attic of the building 10 is a tank 18 which may contain either water or under some circumstances it may contain a solution which freezes at temperatures below 32° F. My invention comprehends cooling the water in tank 18, and when the operation is arranged such that the water may be cooled below 32° F., a solution which freezes at a temperature lower than the freezing point of water is used instead. The tank 18 is preferably insulated to minimize transfer of heat between the water in the tank and the air in the attic.

One end of the heat exchanger 14 is connected to the discharge of a circulating pump 19 which is driven by an electric motor, the inlet of the pump being connected to the lower part of the tank 18 by a pipe 20. The other end of the heat exchanger 14 is connected to the upper part of the tank 18 by a pipe 21.

The heat exchange coil 14 forms a device which acts as a radiator which radiates heat to space at night so as to lower the temperature of the water in the coil and which acts as an absorber of heat in the daytime to absorb radiant heat from the sun so as to heat the water in the heat exchanger. Objects that are good radiators of heat are also good absorbers and vice versa.

The primary objects of my invention are to cool the water in the tank 18 by means of radiation from the coil 14 and at other times to heat the water in the tank 18 by means of absorption of radiant heat at the coil 14. As will be presently pointed out, my invention provides means for storing the heating and cooling effects which can be produced by the system as so far described and utilizing these effects for maintaining the temperature of a space at desired values at times when the temperature deviates from these values.

Thus when it is desired to cool the water in the tank 18 and store up a cooling effect which may be subsequently utilized for cooling, circulator 19 is operated at night to circulate the water through the heat exchanger 14 and back to the tank 18. During the night heat will be radiated from the coil 14 to space in substantial amounts, or in other words at a relatively high rate, this effect being particularly pronounced on a clear night. The heat given up by the coil 14 by radiation in this manner will lower the temperature of the water in the coil to a value considerably below the lowest temperature to which the air falls during the night. The principle underlying this temperature fall of the water in the coil is the same as that involved when frost forms on the ground or on other objects which radiate heat at night even though the air temperature is above freezing. That is, the ground is heated by radiation from the sun in the daytime. At night when the sun is not shining, there is a considerably greater proportion of radiation of heat from the ground to space, which radiation causes the temperature at the surface of the earth to fall to a value lower than the temperature of the air, the temperature of the air being governed primarily by convection and conduction. The surface of the earth thus being at a lower temperature than the air condenses moisture out of the air, and it forms on the ground as frost or dew. It is known that ice can be produced on water by digging a hole in the ground and letting water remain in the hole overnight. The water will be cooled by radiation during the night causing ice to form on it. It is known that ice has been formed in this manner by the radiation of heat when the temperature of the air did not fall lower than 56° F. during the night.

From the foregoing, it is to be seen that relatively low temperatures of the water in the tank 18 can be produced at night in the manner above described, these temperatures sometimes being as low as or below the freezing point of water. The heat insulating material 15 prevents the coil 14 from being heated at night by radiation and conduction of heat from the roof of the house itself. When the temperature of the water in tank 18 has been lowered to a relatively low value, the tank of water, as a whole, represents a substantial amount of cooling effect which can be utilized subsequently.

If it is desired to store up heat, that is heating effect, in the water in the tank 18, the circulator 19 is operated in the daytime when the sun is shining. Under these circumstances the coil 14 and the water therein will absorb a great deal of radiant heat from the sun and the water in the coil on a warm sun-shiny day may be heated to temperatures as high as 160° F. and the entire body of water in tank 18 may be brought up substantially to this temperature. In the daytime the temperature of coil 14 may be higher than the temperature of the roof 11 of the house, and under these circumstances transfer of heat from the coil to the roof is substantially prevented by the heat insulating material 15. It is to be seen therefore that in the daytime the temperature of the coil 14 may be raised to a value considerably higher than the temperature of the surrounding atmosphere.

From the foregoing description of the invention as so far made, it is to be seen that a heat transfer system is provided having means whereby heating effect or cooling effect may be stored.

My invention provides means for augmenting the cold storing and heat storing properties of the system so that greater amounts of cooling effect or heating effect can be stored and preserved for longer periods of time. Within the tank 18 are containers 23 which are filled with a fluid which freezes at a temperature of approximately 50° F. A list of suitable substances is given below:

| | |
|---|---|
| Acetaldehyde | Penta decane |
| Creosol | Phenyl-cyclo-hexane |
| Cyclo hexane | Silico iodoform |
| Ethyl diamine | Undecyl alcohol |
| Nitro styrene | |

Any number of containers, such as the containers 23, may be provided, and when the temperature of the water in tank 18 is lowered to a point below 50° F., the substance in containers 23 freezes, thereby giving up a substantial amount of additional heat depending on the heat of fusion of the substance used and thereby increasing the amount of cooling effect stored. Subsequently the water in tank 18 is used for cooling purposes so that its temperature is raised above 50° F. so as to melt the substance in containers 23 and this substance then takes up an amount of heat equal to that which it gave off when it froze. Thus while the substance in containers 23 is melting, the temperature of the water in tank 18 is kept near the melting point of the substance.

Also within the tank 18 immersed in the water therein are containers 24 containing a substance which is a solid at ordinary temperatures and which has a melting point of around 130° F. One substance suitable for use in the containers 24 is a substance known as Wood's metal, which melts at a temperature of around 130° F. The purpose of containers 24 and the substance therein is to augment the heat storing properties of the system. Thus during the daytime the temperature of the water in tank 18 may be raised to a relatively high value of perhaps 150° F. or 160° F. at which temperature the substance in containers 24 melts so as to take up a substantial amount of heat determined by the heat of fusion of the substance. At a subsequent time when the water in tank 18 is used for heating purposes, its temperature will be lowered to a value below the melting point, that is, the solidifying point of the substance in containers 24, causing the substance to again solidify and to thus give off an amount of heat equal to that which it took up when it melted. Thus the heat storing properties of the system are augmented by reason of the containers 24 and the substance therein. When this substance solidifies it tends to cause the temperature of the water in tank 18 to remain at the solidifying temperature of the substance while it is solidifying.

For cooling or heating the space 13, my invention provides a finned heat exchange coil 27 through which water may be circulated from the tank 18 by a circulator 28 driven by an electric motor. The discharge of the circulator is connected to the coil 27 by a pipe 29, and the inlet of the circulator is connected to the tank 18 by a pipe 30. The outlet of the coil 27 is connected to the tank 18 by a pipe 31.

My invention provides automatic controls for circulating the hot water through the heat exchange coil 27 when heating of the space is required and for circulating cold water through the coil 27 when cooling of the space is required. These controls will be presently described.

In practicing my invention I prefer to provide control means to provide that a cooling effect or a heating effect will be stored up in the system at such times that the required effect will be available when necessary. To accomplish this, I provide controls for operating the circulator 19 at night depending upon whether or not it can be reasonably expected that cooling will be needed on the following day, and for operating the circulator 19 during the day depending upon whether or not it can be reasonably expected that heating will be required that night. Of course the circulator 19 can be operated at night if cooling is needed at the time or it can be operated in the daytime for heating at the time.

The controls for circulator 19 including a timing device 34 comprising an electric timing motor 35 supplied with power by wires 36 and 37. The timing motor 35 drives a twenty-four hour cam 38 which is mounted on the shaft of the timing motor. The cam 38 makes one revolution in twenty four hours and has a single dwell which is preferably of an extent adjustable between something more and something less than 180° of circumferential extent of the cam. The cam 38 has a cam follower in the form of a pivoted lever 39 carrying a double-ended mercury switch 40 having a pair of electrodes at each end. The cam is arranged to cause the electrodes at one end of the mercury switch to be bridged at night and the electrodes at the other end of the mercury switch to be bridged during daylight hours. The cam 38 may be made manually adjustable so as to make closure of the opposite ends of the mercury switch correspond to hours of daylight and darkness or a so-called astronomical disk may be used which is part of a timing mechanism which automatically adjusts the cam throughout the year so that the closed periods of each end of the mercury switch always correspond to the hours of daylight and darkness.

The controls additionally include a thermostat 41 in the space 13 and a similar thermostat 42 also in the space. The thermostat 41 comprises a bimetal element 43 arranged to actuate a movable switch blade 44 in a manner to cause the switch blade to engage a fixed electrical contact 45 at a temperature which may be 75° for example, the blade 44 moving toward its associated contact upon a rise in temperature. Associated with the blade 44 is a permanent magnet 46 which causes the thermostat to operate with a snap action. The thermostat may have a one degree differential for example. The thermostat 42 corresponds to the thermostat 41; its elements being numbered the same with the identifying letter a. The thermostat 42 however is set to close its contacts at a temperature which may be 70° for example and this thermostat closes its contacts upon a fall in temperature rather than a rise in temperature.

During the nighttime the left end of mercury switch 40 will be closed as shown in Fig. 1. If during the night the temperature within the space 13 rises to 75°, it can reasonably be expected that cooling of the space will be required on the following day because it is usually warmer in the daytime than during the night. Thus if the temperature in the space rises to 75° or above, the thermostat 41 will close its contacts thereby energizing the motor of circulator 19 through the following circuit: from line conductor 50 through wire 86, element 43, blade 44, contact 45, wire 52, the left end of mercury switch 40, wire 53, wire 54, the motor of circulator 19 and wire 55 back to line conductor 51, the line conductors 50 and 51 being connected to a suitable source of power not shown. As long as the circulator 19 operates, water from the tank 18 will be circulated through the coil 14 and will be cooled in the manner above described, so as to build up a substantial cooling effect in the tank 18.

If the temperature in the space 13 does not rise to 75° at night, it is not expected that cooling will be needed on the following day and so the circulator 19 is not operated.

During the daytime the right end of mercury switch 40 will be closed placing thermostat 42 in control of the circulator 19, and if during the daytime the temperature in the space 13 falls to 70° or lower, it can be reasonably expected that heating will be required that night because it is ordinarily cooler at night than in the daytime. Thus if the temperature falls to 70°, thermostat 42 will close its contacts energizing the motor of circulator 19 through the following circuit: from line conductor 50 through conductor 57, element 43a, blade 44a, contact 45a, wire 58, the right end of mercury switch 40, wire 59, wire 54, the motor of circulator 19 and motor 55 back to line conductor 51. As long as the circulator 19 operates during the day, water from tank 18 will be circulated through the coil 14 and it will be heated so as to store up a substantial amount of heat in the tank 18 in the manner above described.

The controls which control the temperature in space 13 will now be described. These controls include a pair of thermostats 60 and 61 responsive to the temperature in the space 13. The thermostat 60 includes the bimetal element 62 arranged to operate a movable switch blade 63 which cooperates with a fixed electrical contact 64. The blade 63 is moved to the left upon fall in temperature and is brought into engagement with the contact 64 at a temperature which may be 68° F., for example. Associated with the blade 63 is a permanent magnet 65 which causes the thermostat to operate with a snap action. The thermostat may have a one degree differential for example. The thermostat 61 corresponds to the thermostat 60, its elements being numbered the same and having an identifying letter a. However the thermostat 61 makes its contacts upon a rise in temperature and preferably is so set that it closes its contacts at 80° F. for example.

Connected in series with the thermostat 60 is a thermostatic switch 70 and connected in series with the thermostat 61 is a thermostatic switch 71. The thermostatic switch 70 comprises an expansible and contractible bellows 72 connected to a thermal bulb 73 disposed in the water in tank 18, by means of a capillary tube 74. The bulb 73 is filled with a volatile liquid which vaporizes and causes a pressure to build up in the bulb and bellows 72 dependently upon the temperature in the water in tank 18 so that the bellows 72 expands and contracts accordingly. The bellows 72 has an operating stem into engagement with which a switch operating lever 75 is normally urged by a coil spring 76. The lever 75 carries a mercury switch 77 having electrodes at its left end which are bridged when the bellows 72 expands in response to the existence of a predetermined pressure therein which may be a pressure corresponding to a temperature of the water in tank 18 of 69° F., for example. The temperature responsive switch 70 may have a differential of one degree for example; that is, the switch 77 may open at a temperature of 68° of the water in tank 18.

The thermostatic switch 71 corresponds to the thermostatic switch 70, the elements being similarly numbered with the identifying letter a. However the electrodes of mercury switch 77a are at the right end of the switch so that the switch is closed upon a fall in temperature rather than upon a rise in temperature, the mercury switch 77a closing at a temperature of the water in tank 18 which may be 78° F., for example. The thermostatic switch 71 may also have a differential of one degree, the mercury switch 77a opening at a temperature of 79° F. The thermostats 60 and 61 and the temperature responsive switches 70 and 71 control the motor of circulator 28, the purposes of switches 70 and 71 being to prevent operation of the circulator for heating unless the water in tank 18 is at a temperature high enough for heating purposes and to prevent operation of the circulator 28 for cooling unless the temperature of the water in tank 18 is low enough for cooling purposes.

If at any time the temperature in the space 13 rises to 80° F., thermostat 61 closes its contacts. If at this time the temperature of the water in tank 18 is at 78° or below so that cooling can be affected, a circuit is completed for the motor of circulator 28 as follows: from line conductor 50 through wire 80, element 62a, blade 63a, contact 64a, wire 81, mercury switch 77a, wire 82, wire 83, the motor for circulator 28, and wire 84 back to line conductor 51. Completion of this circuit will cause the circulator 28 to operate and the water from the tank 18 will be circulated through the heat exchange coil 27 for cooling the space 13. As long as cooling is available by the water in tank 18, the thermostat 61 will control the circulator 28 to prevent the temperature in the space from rising above 80° F.

It is to be seen that the thermostat 61 can control the circulator 28 in the manner just described for cooling the space 13 either at night or in the daytime. Obviously if the thermostat 61 operates the circulator 28 at night, the circulator 19 will be operating at the same time in response to thermostat 41 to keep the water in tank 18 cold and to build up the cooling effect stored in the tank.

If at any time the temperature in the space 13 falls to 68° F., thermostat 60 will close its contacts. If at this time the temperature of the water in tank 18 is at or above 69° F., such that heating can properly be affected by the coil 27, a circuit will be completed for the motor of circulator 28 as follows: From line conductor 50 to wire 87, element 62, blade 63, contact 64, wire 88, mercury switch 77, wire 89, wire 83, the motor of circulator 28 and wire 84 back to line conductor 51. In this manner the thermostat 60 will control the circulator 28 to prevent the temperature in the space 13 from falling below 68° F.

If the thermostat 68 calls for heating during the daytime, the circulator 19 will of course be in operation at the same time because thermostat 42 will at this time be closed so that water is being circulated through the coil 14 for heating it and for building up heating effect in the tank 18.

From the foregoing, it is to be seen that the arrangements of my invention provide for utilizing natural heating and cooling effects by storing these effects and using them when required to maintain the temperature of the space at desired values. By reason of my particular arrangement, sufficiently great temperature differentials can be produced between the temperature changing agency and the temperature of the space such that substantial cooling and heating effects can be stored and preserved to be subsequently used as required. The temperature differentials produced by my arrangements are considerably greater than can be produced by ordinary conduction or convection heat transfer methods and, by reason of the substances which I use which melt and solidify, the amounts of cooling effect and heating effect which can be stored are considerably augmented. The controls provide for selective operation of the heat and cold storing system dependent upon whether or not it is to be reasonably expected that heating or cooling of the space will subsequently be required within the length of time that the stored heating and cooling effects can be preserved.

From the foregoing, it is to be observed that my invention is ideally adapted for use in air conditioning in milder climates, particularly in climates wherein during some seasons the days are warm enough and the nights relatively cool, such that heat can be stored during the day for use at night. During other seasons in such climates the nights are cool enough but the days relatively warm so that cooling effect can be stored at night for use during the day.

For selectively determining whether or not the circulator 19 should be operated, outdoor temperature rather than indoor temperature may be utilized. Thus in Fig. 2 of the drawing, I have shown a control arrangement for circulator 19 which is similar to that of Fig. 1 of the drawing wherein the timer shifts control between two controllers designated 90 and 91 which are responsive to outdoor temperature rather than indoor temperature. Thus if the outdoor temperature rises above a value which may be 55° or 65° F., for example, at night it may be reasonably expected that on the following day the outdoor temperature will be high enough so that cooling of the space will be required. Thus the arrangement of Fig. 2 provides for operating the circulator 19 at night when the outdoor temperature rises above a specified value which may be 55° or 65° for example, as pointed out above. The controller 90 comprises an expansible and contractible bellows 92 connected to a thermal bulb 93 disposed outdoors by means of a capillary tube 94; the bulb 93 is filled with a volatile liquid which causes the bellows 92 to expand and contract in accordance with the amount of vaporization of the liquid as determined by outdoor temperature. The bellows has an operating stem into engagement with which a switch operating lever 95 is normally urged by a coil spring 96. The lever 95 carries a mercury switch 97 having electrodes at its left end which are bridged when the outdoor temperature rises to the above mentioned value of 55 or 65° F. The controller 90 may have a one degree differential.

The controller 91 corresponds to the controller 90, its elements being numbered the same and having an identifying letter a. However the electrodes of mercury switch 97a are at its right end, and this switch closes upon a drop in outdoor temperature to a value of 65° F. The timing mechanism places controller 91 in control in the daytime and the circulator 19 is operated in the daytime if the outdoor temperature is below 65° F., it being reasonable to expect that if the temperature is below 65° in the daytime it will be low enough at night to require heating of the space.

During the night time when the left end of mercury switch 40 is closed if mercury switch 97 closes, a circuit is completed for the motor of circulator 19 as follows: from line conductor 50, through wire 100, wire 101, mercury switch 97, wire 102, the left end of mercury switch 40, wire 103, wire 104, the motor of circulator 19 and wire 105 back to line conductor 51. Thus the system is operated for storing cooling effect at night when the outdoor temperature is above a predetermined value.

During the daytime the right end of mercury switch 40 is closed, and if the mercury switch 97a closes, a circuit is completed of the motor of circulator 19 as follows: from line conductor 50, wire 100, wire 106, mercury switch 97a, wire 107, the right end of mercury switch 40, wire 108, wire 104, the motor of circulator 19 and wire 105 back to line conductor 51. Thus in the daytime the system is operated for storing heat when the outdoor temperature is below a predetermined value.

Of course the system can operate to heat the space in the daytime or cool the space at night as in the previous embodiment.

In Fig. 3 of the drawing, I have shown a modified form of the invention wherein instead of using a timer to control the day and night operation of the circulator 19 I utilize a photoelectric cell which shifts control from one thermostat to the other. In Fig. 3 numeral 110 designates a relay comprising a winding 111 having an armature associated therewith attached to the switch blade 112 of a single-pole, double-throw switch, the armature moving the blade 112 into engagement with a fixed electrical contact 113 when the winding 111 is energized, the switch blade 112 engaging a fixed contact 114 when the winding 111 is deenergized. The winding of relay 110 is controlled by a photo-electric cell 115 through wires 116 and 117, power being supplied to the photo-electric cell through wires 118 and 119. The sensitivity of the cell 115 is such and it is so arranged as to energize the relay 110 in the daytime and to deenergize it at night.

Figure 3 includes two thermostats 120 and 121 which may be like the thermostats 41 and 42 of Fig. 1 or the thermostatic controllers 90 and 91 of Fig. 2. Thus at night the thermostat 120 is in control, and if it closes its contacts the motor of circulator 19 is energized through the following circuit: line conductor 50, wire 123, thermostat 120, wire 124, fixed contact 114, switch blade 112, wire 125, the motor of circulator 19 and wire 126 back to line conductor 51. Similarly, in the daytime the thermostat 121 is in control of the circuit, and if it closes its contacts a circuit is completed for energizing the motor of circulator 19 as follows: from line conductor 50, wire 127, thermostat 121, wire 128, contact 113, switch blade 112, wire 125, the motor of circulator 19 and wire 126 back to line conductor 51.

My disclosure is intended to make clear the operating principles of my invention and to explain and describe a concrete form of practicing the invention. It is to be understood however that a great number of variations may be made in the invention without departing from its spirit and scope. For example, the radiating and absorbing coil 14 need not necessarily be in the form of a heat exchanger nor does it have to be mounted on the roof of a building. Also different types of cold storing and heat storing mechanisms may be utilized and different manners of controlling the utilization of the stored heat and cold may be employed.

It is to be understood also that my invention embraces the concept of using an ordinary heat exchanger exposed to atmospheric conditions and affecting heat transfer by well known conduction and convection methods. Using such a heat exchanger, the heat and cold storing mechanism of my invention and the controls take the same form and operate in the same manner as described.

Hence my disclosure is to be interpreted in an illustrative rather than a limiting sense, and the invention is to be limited only in accordance with the claims appended hereto.

I claim as my invention:

1. In apparatus of the character described, in combination, means forming a fluid containing heat exchanger arranged so as to cause the temperature of the fluid flowing through the exchanger to be changed by natural outdoor conditions, a storer of temperature changing effects, means for transferring heat between said storer and said heat exchanger by circulating the fluid medium therebetween whereby temperature changing effect is stored in said storer, means for utilizing the temperature changing effect stored in said storer to control the temperature of an objective, and control apparatus indicative of a prospective need for heating or cooling of said objective controlling said heat transfer means, said control apparatus including selective means responsive to temperature for operating said heat transfer means at one predetermined temperature during the night and at another predetermined temperature during the daytime.

2. In apparatus of the character described, in combination, means forming a fluid containing heat exchanger arranged so as to cause the temperature of the fluid flowing through the exchanger to be changed by natural outdoor conditions, a storer of temperature changing effects, means for transferring heat between said storer and said heat exchanger by circulating the fluid medium therebetween whereby temperature changing effect is stored in said storer, means for utilizing the temperature changing effect stored in said storer to control the temperature of an objective, control apparatus indicative of a prospective need for heating or cooling of said objective controlling said heat transfer means, said control apparatus including selective means responsive to temperature and a day-night timing mechanism for operating said heat transfer means at one predetermined temperature during the night and at another predetermined temperature during the daytime.

3. In apparatus of the character described, in combination, means forming a fluid containing heat exchanger arranged so as to cause the temperature of the fluid flowing through the exchanger to be changed by natural outdoor conditions, a storer of temperature changing effects, means for transferring heat between said storer and said heat exchanger by circulating the fluid medium therebetween whereby temperature changing effect is stored in said storer, means for utilizing the temperature changing effect stored in said storer to control the temperature of an objective, control apparatus indicative of a prospective need for heating or cooling of said objective controlling said heat transfer means, and said control apparatus including selective means responsive to temperature and light intensity responsive means for operating said heat transfer means at one predetermined temperature during the night and at another predetermined temperature during the daytime.

4. In apparatus of the character described, in combination, means forming a fluid containing heat exchanger arranged so as to cause the temperature of the fluid flowing through the exchanger to be changed by natural outdoor conditions, a storer of temperature changing effects, means for transferring heat between said storer and said heat exchanger by circulating the fluid medium therebetween whereby temperature changing effect is stored in said storer, means for utilizing the temperature changing effect stored in said storer to control the temperature of an objective, and control apparatus indicative of a prospective need for heating or cooling of said objective controlling said heat transfer means, said control apparatus including selective means responsive to outdoor temperature for operating said heat transfer means at one predetermined temperature during the night and at another predetermined temperature during the daytime.

5. In a heating and cooling system, in combination, heat and cold storing means, a fluid containing heat exchanger associated therewith for selectively heating or cooling the heat and cold storing means, said heat exchanger being continuously exposed to radiations to and from space for taking up heat from the sun during the day and giving up heat to space at night, and means including temperature responsive means in control of the heating and cooling of said heat and cold storing means by said heat exchanger.

6. In a heating and cooling system, in combination, heat and cold storing means, a fluid containing heat exchanger associated therewith for selectively heating or cooling the heat and cold storing means, said heat exchanger being continuously exposed to radiations to and from space for taking up heat from the sun during the day and giving up heat to space at night, and means including temperature responsive means responsive to a temperature condition indicative of a prospective demand for heating or cooling for causing heating of said heat and cold storing means if said temperature is below a predetermined value during the daytime and for causing cooling of said heat and cold storing means if said temperature is above a predetermined value during the night.

7. In a combined heating and cooling system, in combination, a fluid medium containing heat exchanger continously exposed to atmospheric conditions for receiving heat by radiation from the sun and for radiating heat to space at night, a combined heat and cold storer connected to said heat exchanger for the transfer of heat and cold to such storer by the circulation of said fluid medium, electrical means in control of the circulation of the fluid medium from the heat exchanger to the heat and cold storer, control means in control of said electrical means and including a time switch and a temperature responsive switching mechanism indicative of a prospective need for heating or cooling for establishing circulation of the fluid medium during the day if the temperature is below a predetermined value or during the night if the temperature is above a predetermined value.

8. In apparatus of the character described, in combination, a fluid containing heat exchange device positioned to absorb radiant heat from the sun during the day and to radiate heat to space at night, heat storage means, means in control of the circulation of the fluid medium between said heat exchange device and said heat storage means whereby heat may be delivered to said heat storage means during the day and removed therefrom at night upon radiation of heat to and from said heat exchange device, and control means responsive to a temperature which is indicative of a prospective need for heating or cooling in control of said circulation controlling means.

ALWIN B. NEWTON.